(12) United States Patent
Wang et al.

(10) Patent No.: US 11,374,860 B2
(45) Date of Patent: Jun. 28, 2022

(54) METHOD AND APPARATUS FOR SENDING ROUTING INFORMATION FOR NETWORK NODES

(71) Applicant: Huawei Technologies Co., Ltd., Shenzhen (CN)

(72) Inventors: Haibo Wang, Beijing (CN); Shunwan Zhuang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/226,990

(22) Filed: Apr. 9, 2021

(65) Prior Publication Data
US 2021/0226888 A1 Jul. 22, 2021

Related U.S. Application Data

(63) Continuation of application No. PCT/CN2019/110065, filed on Oct. 9, 2019.

(30) Foreign Application Priority Data

Oct. 12, 2018 (CN) .......................... 201811191878.2

(51) Int. Cl.
*H04L 45/44* (2022.01)
*H04L 45/02* (2022.01)
(Continued)

(52) U.S. Cl.
CPC .............. *H04L 45/44* (2013.01); *H04L 45/02* (2013.01); *H04L 45/24* (2013.01); *H04L 45/74* (2013.01)

(58) Field of Classification Search
CPC ......... H04L 45/44; H04L 45/02; H04L 45/24; H04L 45/74; H04L 45/745
See application file for complete search history.

(56) References Cited

U.S. PATENT DOCUMENTS

| 6,813,644 | B1 | 11/2004 | Jamieson et al. |
| 10,715,419 | B1 * | 7/2020 | Suryanarayana ..... H04L 45/507 |

(Continued)

FOREIGN PATENT DOCUMENTS

| CN | 1794691 A | 6/2006 |
| CN | 101009859 A | 8/2007 |

(Continued)

OTHER PUBLICATIONS

T. Nadeau et al., "A Control Plane for Network Virtualized Overlays draft-drake-nvo3-evpn-control-plane-OO," Internet Engineering Task Force, IETF, Standard Working Draft, Internet Society (ISOC) 4, Rue Des Falaises, CH-1205, Geneva, Switzerland, XP015085591, total 12 pages (Sep. 2012).

(Continued)

*Primary Examiner* — Jimmy H Tran
(74) *Attorney, Agent, or Firm* — Leydig, Voit & Mayer, Ltd.

(57) ABSTRACT

This application discloses a routing information sending method and apparatus. The method includes: receiving, by a first network node, routing information sent by a second network node, and determining the routing information corresponds to a tenant identifier; and then determining, by the first network node, that a third network node belongs to a tenant corresponding to the tenant identifier, and sending the routing information to the third network node in response to determining that the third network node belongs to the tenant corresponding to the tenant identifier.

20 Claims, 7 Drawing Sheets

(51) Int. Cl.
*H04L 45/24* (2022.01)
*H04L 45/74* (2022.01)

(56) References Cited

U.S. PATENT DOCUMENTS

| | | |
|---|---|---|
| 2005/0129015 A1 | 6/2005 | Jamieson et al. |
| 2009/0141717 A1 | 6/2009 | Cabeca et al. |
| 2013/0191257 A1 | 7/2013 | Koodli et al. |
| 2014/0052877 A1* | 2/2014 | Mao ............... H04L 12/4641 709/245 |
| 2014/0254590 A1 | 9/2014 | Yang et al. |
| 2015/0067189 A1* | 3/2015 | Naseh .............. H04L 45/08 709/238 |
| 2015/0124829 A1* | 5/2015 | Koodli ............. H04L 12/4633 370/392 |
| 2015/0363221 A1 | 12/2015 | Terayama et al. |
| 2016/0182352 A1 | 6/2016 | Rosenberg et al. |
| 2016/0212049 A1* | 7/2016 | Davie .............. H04L 45/745 |
| 2016/0301668 A1 | 10/2016 | Marquardt et al. |
| 2017/0026417 A1 | 1/2017 | Ermagan et al. |
| 2017/0063633 A1* | 3/2017 | Goliya ............. H04L 45/72 |
| 2017/0149582 A1* | 5/2017 | Cohn .............. H04L 12/66 |
| 2017/0171057 A1* | 6/2017 | Dong .............. H04L 45/02 |
| 2017/0250906 A1* | 8/2017 | MeLampy ........ H04L 45/566 |
| 2017/0289270 A1* | 10/2017 | Li ................. H04L 41/12 |
| 2017/0317919 A1* | 11/2017 | Fernando ........ H04L 41/0806 |
| 2018/0173557 A1* | 6/2018 | Nakil ............. H04L 41/0631 |
| 2018/0191615 A1* | 7/2018 | de Silva ......... H04L 45/586 |
| 2018/0254972 A1 | 9/2018 | Patel et al. |
| 2019/0081850 A1* | 3/2019 | Nazar ............. H04L 41/0631 |
| 2019/0173736 A1* | 6/2019 | Ponnuswamy ..... H04L 41/145 |
| 2019/0297002 A1* | 9/2019 | Qian ............... H04L 45/24 |
| 2020/0204432 A1* | 6/2020 | Nazar ............. H04L 41/06 |
| 2020/0220802 A1* | 7/2020 | Goliya ............ H04L 45/021 |
| 2020/0287843 A1* | 9/2020 | Zhang ............. H04L 12/4654 |
| 2020/0336420 A1* | 10/2020 | Joshi .............. H04L 45/74 |
| 2021/0029088 A1* | 1/2021 | Mayya ............ H04L 12/4641 |
| 2022/0038310 A1* | 2/2022 | Boutros .......... H04L 12/4641 |

FOREIGN PATENT DOCUMENTS

| | | |
|---|---|---|
| CN | 102624623 A | 8/2012 |
| CN | 103560948 A | 2/2014 |
| CN | 104067565 A | 9/2014 |
| CN | 104348724 A | 2/2015 |
| CN | 106059922 A | 10/2016 |
| CN | 106209688 A | 12/2016 |
| CN | 107018056 A | 8/2017 |
| CN | 108521377 A | 9/2018 |
| CN | 109412951 A | 3/2019 |
| JP | 2016152567 A | 8/2016 |
| KR | 20150076041 A | 7/2015 |
| WO | 2015014187 A1 | 2/2015 |

OTHER PUBLICATIONS

EP/19871460, Search Report, dated Oct. 8, 2021.
Chen Ye et al., "Implementation and research of EVPN based on BGP protocol," total 73 pages (Apr. 2017). With English abstract.
Dunbar et al., "BGP Extension for SDWAN Overlay Networks draft-dunbar-idr-bgp-sdwan-overlay-ext-01," XP055846377, total 9 pages (Oct. 2018).
A. Sajassi et al., "A Network Virtualization Overlay Solution using E-VPN draft-sd-l2vpn-evpn-overlay- 00," EPO Form 1703 01.91 TRI, Internet Engineering Task Force, IETF, Standard Working Draft, Internet Society (ISOC) 4, Rue Des Falaises, CH-1205, Geneva, Switzerland, XP015090257, total 19 pages (Feb. 2013).
T. Nadeau et al., "A Control Plane for Network Virtualized Overlays draft-drake-nvo3-evpn-control-plane-00," Internet Engineering Task Force, IETF, Standard Working Draft, Internet Society (ISOC) 4, Rue Des Falaises, CH-1205, Geneva, Switzerland, XP015085591, total 12 pages (Sep. 2012).

* cited by examiner

METHOD AND APPARATUS FOR SENDING ROUTING INFORMATION FOR NETWORK NODES

CROSS-REFERENCE TO RELATED APPLICATIONS

This application is a continuation of International Application No. PCT/CN2019/110065, filed on Oct. 9, 2019, which claims priority to Chinese Patent Application No. 201811191878.2, filed on Oct. 12, 2018. The disclosures of the aforementioned applications are hereby incorporated by reference in their entireties.

TECHNICAL FIELD

This application relates to the field of communications technologies, and in particular, to a routing information sending method and apparatus.

BACKGROUND

In a software-defined wide-area network (SD-WAN), a plurality of customer premises equipment (CPE) are distributed at different enterprise tenants, and each CPE is used to advertise a route of one enterprise tenant. However, a route reflector (RR) is configured to provide route exchange between the CPEs. In other words, after one CPE sends routing information to the RR, the RR sends routing information to another CPE, to establish a routing path between the two CPEs. The RR may be connected to the plurality of CPEs of the different enterprise tenants, so that the RR needs to advertise routes to the plurality of CPEs of the different enterprise tenants.

Generally, the CPEs of the different tenants do not need to exchange routes with each other. If the RR needs to process route advertisement services of the plurality of tenants, when the RR receives routing information of one tenant, the RR needs to send routing information only to another network node belonging to the tenant, and does not need to send the routing information to a network node of another tenant. In other words, the RR needs to advertise different routes for the different tenants. If the RR sends the routing information to network nodes of all tenants, the network nodes of the tenants store some unnecessary routing information. This results in a waste of resources, prolongs a service processing time period of the RR, and reduces performance. Although the RR may determine, by parsing a routing feature in the routing information, a network node belonging to a tenant corresponding to the routing information, so that the RR can send the routing information only to the determined network node of the specific tenant. However, this determining manner is relatively complex. As a result, it takes a long time for the RR to advertise the routes, and this degrades the performance of the RR.

SUMMARY

Embodiments of this application provide a routing information sending method and apparatus, so that an RR determines, in a simpler manner, a network node that belongs to a same tenant and to which a route needs to be advertised. This reduces a time period for the RR to advertise routes and improves performance of the network node.

According to a first aspect, an embodiment of this application provides a routing information sending method. The method includes: A first network node receives routing information sent by a second network node; the first network node determines the routing information corresponds to a tenant identifier; the first network node determines that a third network node belongs to a tenant corresponding to the tenant identifier; and the first network node sends the routing information to the third network node in response to determining that the third network node belongs to the tenant corresponding to the tenant identifier.

In a route advertising process, the first network node may determine the third network node by using the tenant identifier corresponding to the received routing information, in other words, determine a network node that belongs to a same tenant and to which a route needs to be advertised. In this way, implementation is simpler, a time period required for the first network node to advertise a route can be shortened, and performance of the first network node can be improved.

With reference to the first aspect, in a first possible implementation of the first aspect, that the first network node determines the routing information corresponds to a tenant identifier includes: The first network node determines that a first session corresponds to the tenant identifier, and the first network node receives the routing information through the first session, where the first session is a border gateway protocol session between the first network node and the second network node.

In this implementation, because there is the first session between the first network node and the second network node, a correspondence between a first session and a tenant identifier may be pre-established. In this way, if the first network node receives, through the first session, the routing information sent by the second network node, the first network node may determine, based on the established correspondence, the tenant identifier corresponding to the first session. Because the routing information received by the first network node is received through the first session, the determined tenant identifier corresponds to the routing information.

With reference to the first aspect, in a second possible implementation of the first aspect, that the first network node determines the routing information corresponds to a tenant identifier includes: The first network node determines that the second network node sending the routing information belongs to the tenant corresponding to the tenant identifier.

In this implementation, a correspondence between a second network node and a tenant identifier may be pre-established. In this way, after receiving the routing information, the first network node may determine, based on the correspondence, the tenant identifier corresponding to the second network node sending the routing information. It may be understood that when the second network node corresponds to the tenant identifier, it indicates that the second network node belongs to the tenant corresponding to the tenant identifier.

With reference to any one of the first aspect to the second possible implementation of the first aspect, in a third possible implementation of the first aspect, the method further includes: The first network node generates a routing entry based on the routing information, and adds the routing entry to a routing information base corresponding to the tenant identifier. Optionally, different tenants correspond to different routing information bases. In this way, routing entries of the different tenants are prevented from being stored in one routing information base, to reduce a quantity of routing entries that are in the routing information base and that need to be searched for, to reduce a time period for searching for a routing entry during packet forwarding, and to improve forwarding efficiency.

Because the routing entry is generated and stored based on the routing information, when receiving a packet sent by a device of the tenant corresponding to the tenant identifier, the first network node can forward the packet to a corresponding next network node based on the routing entry stored in the routing information base. In this way, the packet can be forwarded.

With reference to any one of the first aspect to the third possible implementation of the first aspect, in a fourth possible implementation of the first aspect, that the first network node determines that a third network node belongs to a tenant corresponding to the tenant identifier includes: The first network node determines that a second session corresponds to the tenant identifier, where the second session is a border gateway protocol session between the first network node and the third network node.

In this implementation, a correspondence between a second session and a tenant identifier may be pre-established. In this way, after determining the tenant identifier, the first network node may determine, based on the established correspondence, the second session corresponding to the tenant identifier, and determine, based on the second session, the third network node that forms the second session with the first network node. In this way, the third network node belonging to the tenant corresponding to the tenant identifier may be determined based on the second session.

With reference to any one of the first aspect to the fourth possible implementation of the first aspect, in a fifth possible implementation of the first aspect, that the first network node sends the routing information to the third network node includes: The first network node sends the routing information to the third network node by using an execution module corresponding to the tenant identifier, where different tenant identifiers on the first network node correspond to different execution modules, and the execution module includes a central processing unit, a thread, or a process.

In an implementation, because processes in which the first network node sends the routing information to third network nodes of different tenants are independent of each other, when the first network node determines a plurality of tenant identifiers based on the received routing information, a plurality of execution modules that are on the first network node and that correspond to the plurality of tenant identifiers may concurrently send the routing information to the third network nodes belonging to tenants corresponding to the different tenant identifiers, to improve processing efficiency of the first network node.

With reference to any one of the first aspect to the fifth possible implementation of the first aspect, in a sixth possible implementation of the first aspect, the second network node is a customer premises equipment CPE, and the tenant identifier includes one tenant identifier; or the second network node is a route reflector RR, and the tenant identifier includes one or more tenant identifiers.

In this implementation, if the second network node is CPE of a tenant, because the CPE belongs to only one tenant, and corresponds to a tenant identifier of only one tenant, the first network node may determine, based on routing information sent by the CPE, the tenant identifier of the tenant to which the CPE belongs, and there is also only one determined tenant identifier. If the second network node is a node RR that is on a network and that supports a routing connection, because the RR may serve a plurality of tenants, in other words, the RR may belong to the plurality of tenants, and therefore correspond to tenant identifiers of the plurality of tenants, the first network node determines, based on the routing information sent by the RR, the tenant identifiers of the plurality of tenants, and there may be a plurality of determined tenant identifiers. Certainly, if the RR serves only one tenant, there may also be only one determined tenant identifier.

With reference to the sixth possible implementation of the first aspect, in a seventh possible implementation of the first aspect, that the first network node determines the routing information corresponds to a tenant identifier includes: The first network node parses a routing feature in the routing information, and determines, from the one or more tenant identifiers based on the routing feature, the tenant identifier corresponding to the routing information.

In this implementation, if the first network node determines the plurality of tenant identifiers based on the routing information, the first network node may filter, according to a preset filtering policy, the tenant identifier corresponding to the routing information from the plurality of tenant identifiers. In this way, when advertising the route, the first network node needs to advertise the route only to the third network node belonging to the tenant corresponding to the tenant identifier, and does not need to advertise the route to a network node belonging to a tenant corresponding to another tenant identifier, to reduce a scale of the routes advertised by the first network node.

With reference to the seventh possible implementation of the first aspect, in an eighth possible implementation of the first aspect, the routing feature includes any one or more of the following: a prefix address, a community attribute, an extended community attribute, and an autonomous system path that are of the routing information.

According to a second aspect, an embodiment of this application further provides a routing information sending apparatus. The apparatus is applied to a first network node and includes: a receiving module, configured to receive routing information sent by a second network node; a first determining module, configured to determine the routing information corresponds to a tenant identifier; a second determining module, configured to determine that a third network node belongs to a tenant corresponding to the tenant identifier; and a sending module, configured to send the routing information to the third network node in response to determining that the third network node belongs to the tenant corresponding to the tenant identifier.

With reference to the second aspect, in a first possible implementation of the second aspect, the first determining module is specifically configured to determine that a first session corresponds to the tenant identifier, the first network node receives the routing information through the first session, and the first session is a border gateway protocol session between the first network node and the second network node.

With reference to the second aspect, in a second possible implementation of the second aspect, the first determining module is specifically configured to determine that the second network node sending the routing information belongs to the tenant corresponding to the tenant identifier.

With reference to any one of the second aspect to the second possible implementation of the second aspect, in a third possible implementation of the second aspect, the apparatus further includes: a generating module, configured to generate a routing entry based on the routing information; and an adding module, configured to add the routing entry to a routing information base corresponding to the tenant identifier.

With reference to any one of the second aspect to the third possible implementation of the second aspect, in a fourth possible implementation of the second aspect, the second determining module is specifically configured to determine that a second session corresponds to the tenant identifier, and the second session is a border gateway protocol session between the first network node and the third network node.

With reference to any one of the second aspect to the fourth possible implementation of the second aspect, in a fifth possible implementation of the second aspect, the sending module is specifically configured to send the routing information to the third network node by using an execution module corresponding to the tenant identifier.

Different tenant identifiers on the first network node correspond to different execution modules, and the execution module includes a central processing unit, a thread, or a process.

With reference to any one of the second aspect to the fifth possible implementation of the second aspect, in a sixth possible implementation of the second aspect, the second network node is a customer premises equipment CPE, and the tenant identifier includes one tenant identifier; or the second network node is a route reflector RR, and the tenant identifier includes one or more tenant identifiers.

With reference to the sixth possible implementation of the second aspect, in a seventh possible implementation of the second aspect, the first determining module includes: a parsing unit, configured to parse a routing feature in the routing information; and a determining unit, configured to determine, from the one or more tenant identifiers based on the routing feature, the tenant identifier corresponding to the routing information.

With reference to the seventh possible implementation of the second aspect, in an eighth possible implementation of the second aspect, the routing feature includes any one or more of the following: a prefix address, a community attribute, an extended community attribute, and an autonomous system path that are of the routing information.

The routing information sending apparatus provided in the second aspect corresponds to the routing information sending method provided in the first aspect. So that for various possible implementations of the routing information sending apparatus provided in the second aspect, refer to various possible implementations of the routing information sending method provided in the first aspect.

According to a third aspect, an embodiment of this application provides a computer-readable storage medium. The computer-readable storage medium stores an instruction, and when the instruction is run on a computer or a processor, the computer or the processor is enabled to perform the method in the first aspect or any possible design of the first aspect.

According to a fourth aspect, an embodiment of this application provides a computer program product including an instruction. When the computer program product runs on a computer or a processor, the computer or the processor is enabled to perform the method in any one of the first aspect or the possible designs of the first aspect.

In this embodiment of this application, after receiving the routing information sent by the second network node, the first network node may determine the tenant identifier corresponding to the routing information, and then determine the third network node. The third network node belongs to the tenant corresponding to the tenant identifier. In this way, the first network node may send the corresponding routing information to the third network node, to complete route advertisement. It can be learned that, in the route advertising process, the first network node may determine the third network node by using the tenant identifier corresponding to the received routing information, in other words, determine a network node that belongs to a same tenant and to which a route needs to be advertised. In this way, implementation is simpler, the time period required for the first network node to advertise the route can be shortened, and performance of the first network node can be improved.

BRIEF DESCRIPTION OF DRAWINGS

To describe the technical solutions in the embodiments of this application more clearly, the following briefly describes the accompanying drawings for describing the embodiments. It is clear that the accompanying drawings in the following description show merely some embodiments of this application, and an ordinary person skilled in the art may derive other drawings from these accompanying drawings.

DESCRIPTION OF EMBODIMENTS

Figure 1:
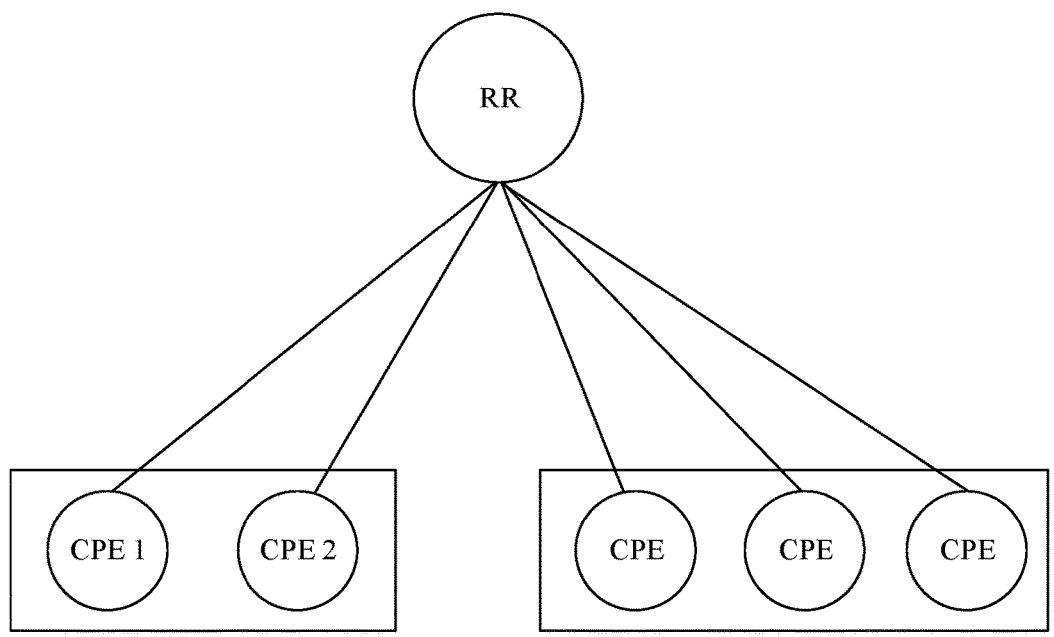
FIG. 1 is a schematic structural diagram of a network including CPE 1 and CPE 2.

On some networks, CPEs belonging to different tenants do not need to receive or send routes from each other. However, based on a network deployment requirement, different CPEs belonging to a same tenant cannot directly receive or send routes from each other. Instead, the CPEs send routes to or receive routes from a specific network node such as an RR. For example, as shown in FIG. 1, CPE 1 and CPE 2 cannot directly receive or send a route from each other. When a routing path between the CPE 1 and the CPE 2 needs to be established, generally, the CPE 1 first sends routing information to the RR, and then the RR sends routing information to the CPE 2. In this way, the routing path between the CPE 1 and the CPE 2 is established. The CPE 1 and the CPE 2 belong to the same tenant, and other CPEs belong to another tenant.

Generally, the RR is connected to the plurality of CPEs belonging to the different tenants. Therefore, if the RR receives routing information sent by CPE, the RR parses a routing feature in the routing information, and determines, from a plurality of network nodes adjacent to the RR, a network node (which may be CPE or another RR) belonging to a tenant corresponding to the routing information. Specifically, the RR compares the routing feature obtained by parsing with a routing feature of a route that can be advertised by the RR to another network node, and determines a network node corresponding to a route whose routing feature is consistent, so that the RR may send the routing information to the determined network node.

However, there is a relatively complex implementation process in this manner in which the routing feature needs to be parsed from the routing information, and the routing feature needs to be compared, to determine a network node that needs to receive routing information. Besides, there are generally a relatively large quantity of network nodes adjacent to the RR. As a result, there are also a large quantity of routes whose routing features are compared by the RR. This takes a long time and degrades performance of the network nodes by using this method.

Based on this, to resolve the foregoing technical problem, in this embodiment of this application, a tenant identifier corresponding to the received routing information may be used to determine the network node that needs to receive the routing information. This reduces a time period for determining the network node, and improves the performance of the network nodes. Specifically, a tenant identifier may be preset for a tenant to which a network node on a network belongs. Network nodes belonging to a same tenant correspond to a same tenant identifier, and different tenants correspond to different tenant identifiers. Because network nodes belonging to the different tenants usually do not need to receive and send routes to each other, after receiving routing information sent by a second network node adjacent to the first network node, the first network node may advertise a route only to a third network node that has a same tenant identifier as the second network node, and does not need to advertise the route to a network node corresponding to another tenant identifier, to determine the network node that receives the routing information. Compared with the manner in which the routing feature in the routing information is parsed and compared, to determine the network node that needs to receive the routing information, this manner is simpler. The time period required for the first network node to advertise the route may be shortened, and performance of the first network node is improved.

Figure 2:
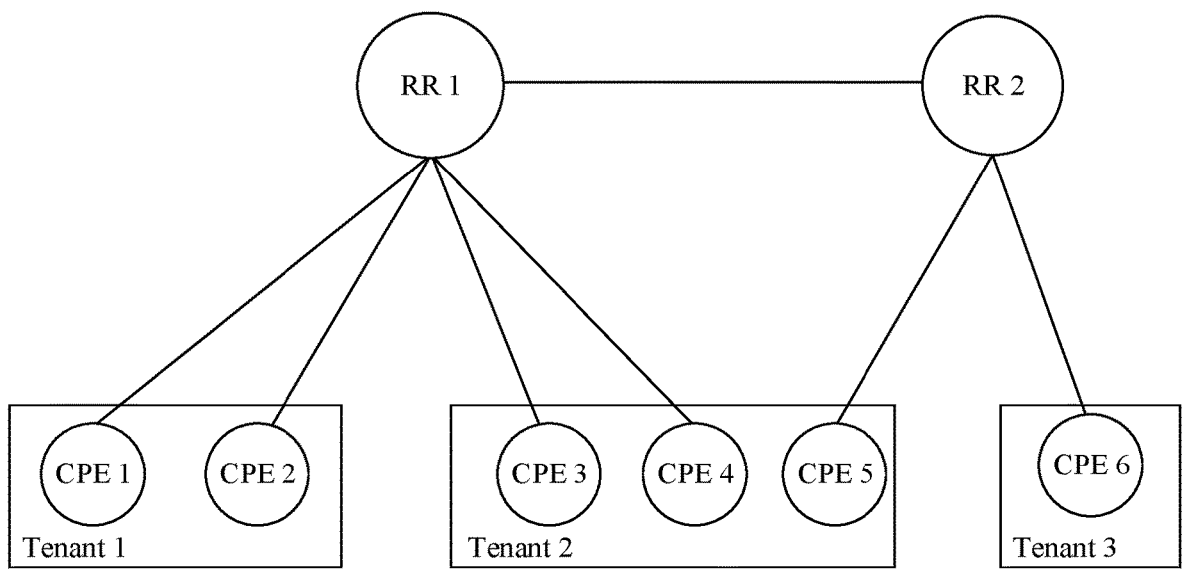
FIG. 2 is a schematic structural diagram of a network in an example application scenario according to an embodiment of this application.

For example, one of scenarios in this embodiment of this application may be applied to an SD-WAN network topology structure shown in FIG. 2. CPE 1 and CPE 2 belong to a tenant 1, and a routing path may be established by using an RR 1. A network formed by the CPE 1 and the CPE 2 that belong to the tenant 1 may also be referred to as a network slice 1, for example, a slice 1. In other words, different tenant identifiers may represent different network slices. CPE 3, CPE 4, and CPE 5 belong to a tenant 2, and a routing path may be established by using the RR 1 and/or an RR 2. A network formed by the CPE 3, the CPE 4, and the CPE 5 that belong to the tenant 2 may also be referred to as a network slice 2, for example, a slice 2. CPE 6 belongs to a tenant 3.

If the CPE 1 currently needs to establish the routing path with the CPE 2, the CPE 1 may advertise a route to the RR 1, in other words, send routing information to the RR 1. After receiving the routing information, the RR 1 may determine that the routing information sent by the CPE 1 corresponds to a tenant identifier of the tenant 1. Then, the RR 1 may determine the CPE 2 belonging to the tenant 1, and send routing information to the determined CPE 2, so that the routing path is established between the CPE 1 and the CPE 2 by using the RR 1. In a process of establishing the routing path between the CPE 1 and the CPE 2, the RR 1 determines, based on the tenant identifier of the tenant 1, the CPE 2 belonging to the tenant 1, and further advertises a route only to the CPE 2. In this way, the RR 1 may determine, in a relatively short time, the CPE 2 to which the route needs to be advertised. This improves performance of the network node.

It may be understood that the foregoing scenario is merely an example of a scenario provided in this embodiment of this application, and this embodiment of this application is not limited to this scenario.

With reference to the accompanying drawings, the following describes in detail specific implementations of the routing information sending method in this embodiment of this application by using embodiments.

Figure 3:
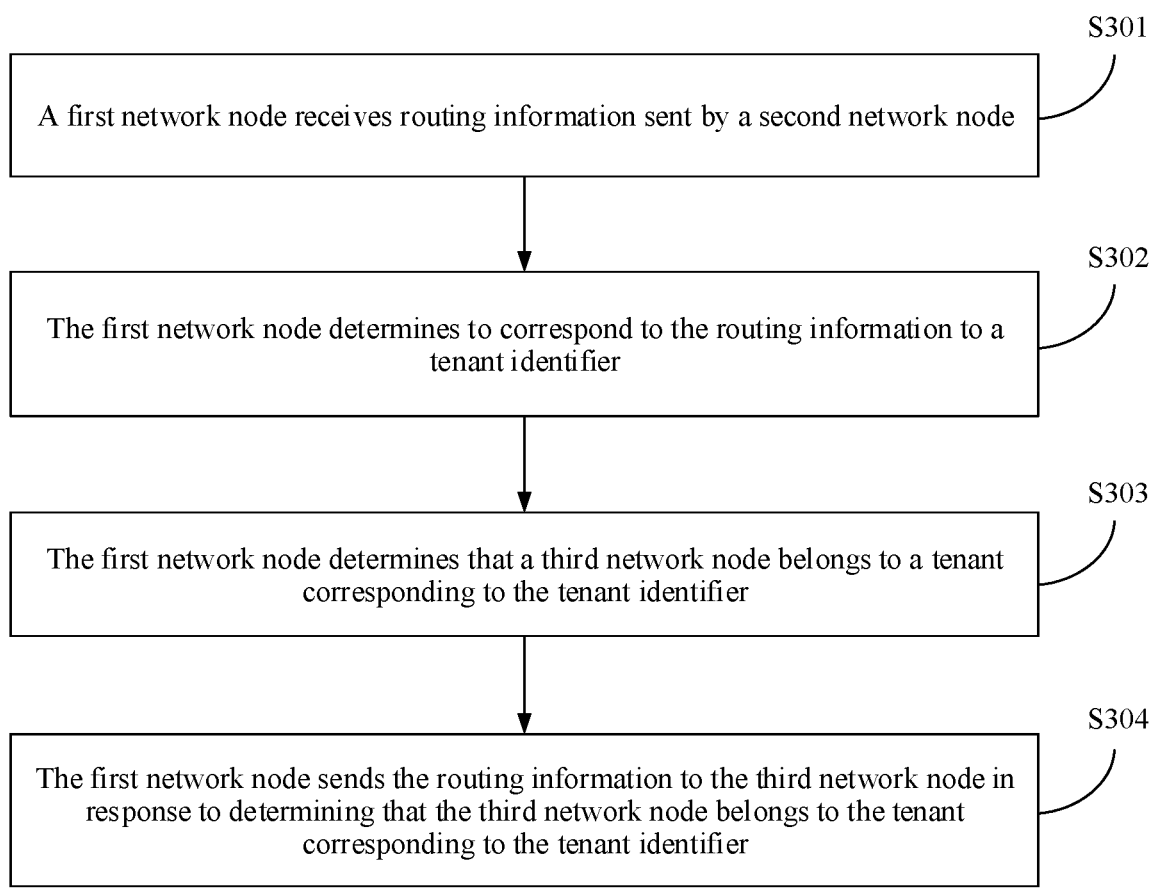
FIG. 3 is a schematic flowchart of a routing information sending method according to an embodiment of this application.

FIG. 3 is a schematic flowchart of a routing information sending method according to an embodiment of this application. The method may specifically include the following steps.

S301: A first network node receives routing information sent by a second network node.

In this embodiment, the first network node may be a node on a network, for example, a router or a switch on the network, that can support a routing connection between the second network node and a third network node, and the second network node may be a device belonging to a tenant, or a node that is on the network and that can support establishment of a routing connection between the device and another network node. The first network node is adjacent to the second network node. For example, when this embodiment is applied to the application scenario shown in FIG. 2, the second network node may be the CPE 1, and the first network node adjacent to the second network node is the RR 1 that supports establishment of a routing connection between the CPE 1 and the CPE 2. Certainly, the second network node may also be the RR 1, and the RR 1 may support the CPE 3 in separately establishing a routing connection to the CPE 4 and the CPE 5. In this case, the first network node adjacent to the second network node is the RR 2 that can also support the routing connection.

S302: The first network node determines to correspond to the routing information to a tenant identifier.

Generally, devices on which a routing connection needs to be performed usually belong to a same tenant, and devices on which the routing connection does not need to be performed belong to different tenants. Based on this, in this embodiment, a corresponding tenant identifier may be established for each tenant, and the tenant identifier may be used to distinguish among a plurality of tenants served by the first network node. Correspondingly, routing information sent by different second network nodes belonging to the same tenant corresponds to the same tenant identifier, and routing information sent by second network nodes belonging to the different tenants corresponds to different tenant identifiers. In an actual application, devices of a tenant on the network may be sliced. Specifically, devices that are on the network and that belong to the same tenant may be grouped into a same network slice. In this case, the network slice includes the devices that belong to the same tenant, and the network slice corresponds to a tenant identifier of the tenant, in other words, the devices of the different tenants belong to different network slices, and the different network slices correspond to the different tenant identifiers.

In an example implementation of determining the tenant identifier, the first network node may configure, in advance by using configuration information of a tenant identifier, the tenant identifier for the second network node adjacent to the first network node. Specifically, the first network node may configure the tenant identifier for the second network node by using the tenant identifier and a session between the first network node and the second network node. A tenant represented by the tenant identifier is a tenant served by the first network node or a tenant to which the second network node belongs. In this way, after receiving, based on a first session between the first network node and the second network node, the routing information sent by the second network node, the first network node may determine a tenant identifier corresponding to the first session. In an example, the first session may be a BGP (border gateway protocol) session between the first network node and the second network node.

During specific implementation, a correspondence between a tenant identifier and a first session between a first network node and a second network node may be pre-established. In this way, after receiving the routing information sent by the second network node, the first network node may first determine the first session that transmits the routing information, and then, determine, based on the pre-established correspondence between the first session and the tenant identifier, the tenant identifier corresponding to the first session.

In an actual application, in addition to determining the tenant identifier based on the session, the tenant identifier may also be directly determined based on the second network node. Specifically, in another example implementation of determining the tenant identifier, a correspondence between a second network node and a tenant identifier may be pre-established, and the correspondence may be configured on the first network node. In this way, after receiving the routing information, the first network node may first determine a network node that sends the routing information as the second network node, and then determine, based on the pre-established correspondence between the second network node and the tenant identifier, the tenant identifier corresponding to the second network node. It may be understood that, in the actual application, the first network node may receive routing information sent by a plurality of network nodes. A correspondence between each network node and a tenant identifier of a tenant to which the network node belongs may be pre-established, and correspondences between the plurality of network nodes and the tenant identifiers are configured on the first network node.

It should be noted that in different application scenarios, there may be one or more tenant identifiers determined by the first network node based on the received routing information.

Specifically, when the second network node is CPE, because the CPE belongs to only one tenant, after receiving the routing information sent by the CPE, the first network node may determine, based on the correspondence between the tenant identifier and the first session between the CPE and the first network node, that the routing information corresponds to only one tenant identifier, in other words, a tenant identifier of a tenant to which the CPE belongs.

When the second network node is an RR, because the RR may serve the plurality of tenants, the first network node may not accurately determine a specific tenant based on only the routing information sent by the second network node, where the routing connection needs to be established between devices of the specific tenant. Based on this, if the first network node serves only one tenant, there is still one tenant identifier determined based on the routing information. However, if the first network node serves the plurality of tenants, the first network node may determine the plurality of tenant identifiers based on the routing information. A tenant corresponding to each determined tenant identifier is served by the first network node. In addition to a tenant identifier of a target tenant, the plurality of tenant identifiers further include a tenant identifier of another tenant. The target tenant is the tenant to which the devices belong, and the routing connection needs to be established between the devices. It may be understood that although the first network node cannot determine the specific tenant based on only the received routing information, where the routing connection needs to be established between the devices of the specific tenant, the tenant is definitely the tenant served by the first network node. So that the tenant identifiers of the plurality of tenants served by the first network node are determined, and finally established route connections can include the route connection that needs to be established between the devices of the target tenant. In some possible implementations, the plurality of determined tenant identifiers may be tenant identifiers corresponding to a tenant jointly served by the first network node and the second network node, or certainly may be tenant identifiers corresponding to all tenants served by the first network node.

S303: The first network node determines that the third network node belongs to the tenant corresponding to the tenant identifier.

After determining the tenant identifier, the first network node may further determine, based on the determined tenant identifier, the third network node belonging to the tenant corresponding to the tenant identifier. The third network node may be a device belonging to the tenant corresponding to the tenant identifier, or a node that is on the network and that can support establishment of the routing connection between a device of the tenant and another network node. The first network node is adjacent to the third network node. For example, when this embodiment is applied to the application scenario shown in FIG. 2, if the first network node is the RR 1, the third network node adjacent to the first network node may be the CPE 2 that needs to establish the route connection to the CPE 1, and the second network node is the CPE 1; or the third network node may be the RR 2 that supports establishment of a route connection between the CPE 3 and the CPE 4, and between the CPE 3 and the CPE 5, and the second network node is the CPE 3.

In an example, the first network node may determine the third network node based on a second session corresponding to the determined tenant identifier. During specific implementation, a correspondence between a session and a tenant identifier may be pre-established. The session is a session between the first network node and a network node that needs to receive the routing information. A tenant corresponding to the tenant identifier is a tenant jointly served by the first network node and the another network node. In this way, after determining the tenant identifier, the first network node may determine, based on the established correspondence between the session and the tenant identifier, the second session corresponding to the tenant identifier, and then may determine the third network node based on the second session. The second session is a session between the first network node and the third network node. In an example, the second session may be specifically the BGP session.

S304: The first network node sends the routing information to the third network node in response to determining that the third network node belongs to the tenant corresponding to the tenant identifier.

Because the determined third network node and the first network node belong to the tenant corresponding to the same tenant identifier, the first network node may send the routing information to the third network node, to continue to establish a routing path based on a route established between the first network node and the second network node.

It should be noted that, processes in which the first network node sends the routing information to third network nodes of the different tenants are independent of each other, in other words, when the first network node sends the routing information to a third network node belonging to a tenant corresponding to a tenant identifier A, this does not affect sending, by the first network node, the routing information to a third network node belonging to a tenant corresponding to a tenant identifier B. Based on this, in some possible implementations, execution modules that are independent of each other may be disposed based on the tenants served by the first network node. An execution module of each tenant corresponds to a tenant identifier of the tenant, and the execution modules of the different tenants correspond to the different tenant identifiers. When the first network node needs to send the routing information to a third network node of a tenant belonging to a tenant identifier, an execution module that is on the first network node and that corresponds to the tenant identifier may send the routing information. In this way, when the first network node determines the plurality of tenant identifiers based on the received routing information, the plurality of execution modules that are on the first network node and that correspond to the plurality of tenant identifiers may concurrently send the routing information to third network nodes belonging to tenants corresponding to the different tenant identifiers, to improve processing efficiency of the first network node. In an example, an execution module corresponding to each tenant identifier may include a central processing unit, a thread, a process, or the like on the first network node.

In an actual application, after determining the tenant identifier based on the received routing information, the first network node may further generate a routing entry based on the routing information, and may add the routing entry to a routing information base corresponding to the tenant identifier. In some possible implementations, the routing information base may be stored on the first network node, so that when receiving a packet sent by the device of the tenant corresponding to the tenant identifier, the first network node can forward the packet to a corresponding next network node based on the routing entry stored in the routing information base. In this way, the packet can be forwarded.

It may be understood that because the routing connection may be implemented, by using the first network node and the second network node, or by using the first network node and the another network node, between devices of the tenant corresponding to the tenant identifier, in addition to the routing entry generated based on the routing information sent by the second network node, a routing entry generated based on routing information sent by the another network node adjacent to the first network node may be stored in the routing information base corresponding to the tenant identifier.

Further, different routing information bases may be set for the different tenants. In this way, routing entries of the different tenants are prevented from being stored in one routing information base, to reduce a quantity of routing entries that are in the routing information base and that need to be searched for, to reduce a time period for searching for the routing entries during packet forwarding, and to improve forwarding efficiency.

In the actual application, the first network node may determine the plurality of tenant identifiers based on the routing information sent by the second network node, so that the first network node sends the routing information to third network nodes corresponding to the plurality of tenant identifiers. Based on this, in some possible implementations, to reduce a scale of routes advertised by the first network node, a corresponding filtering policy may be set on the first network node. When determining the plurality of tenant identifiers based on the routing information, the first network node may determine, according to the filtering policy, a specific tenant to which the devices belong, where the routing connection is established between the devices, in other words, the first network node may determine, from the plurality of tenant identifiers, a tenant identifier of the tenant to which the devices belong, where the routing connection is established between the devices, so that the first network node advertises the route only to the third network node corresponding to the tenant identifier, to reduce the scale of the routes advertised by the first network node.

Figure 4:
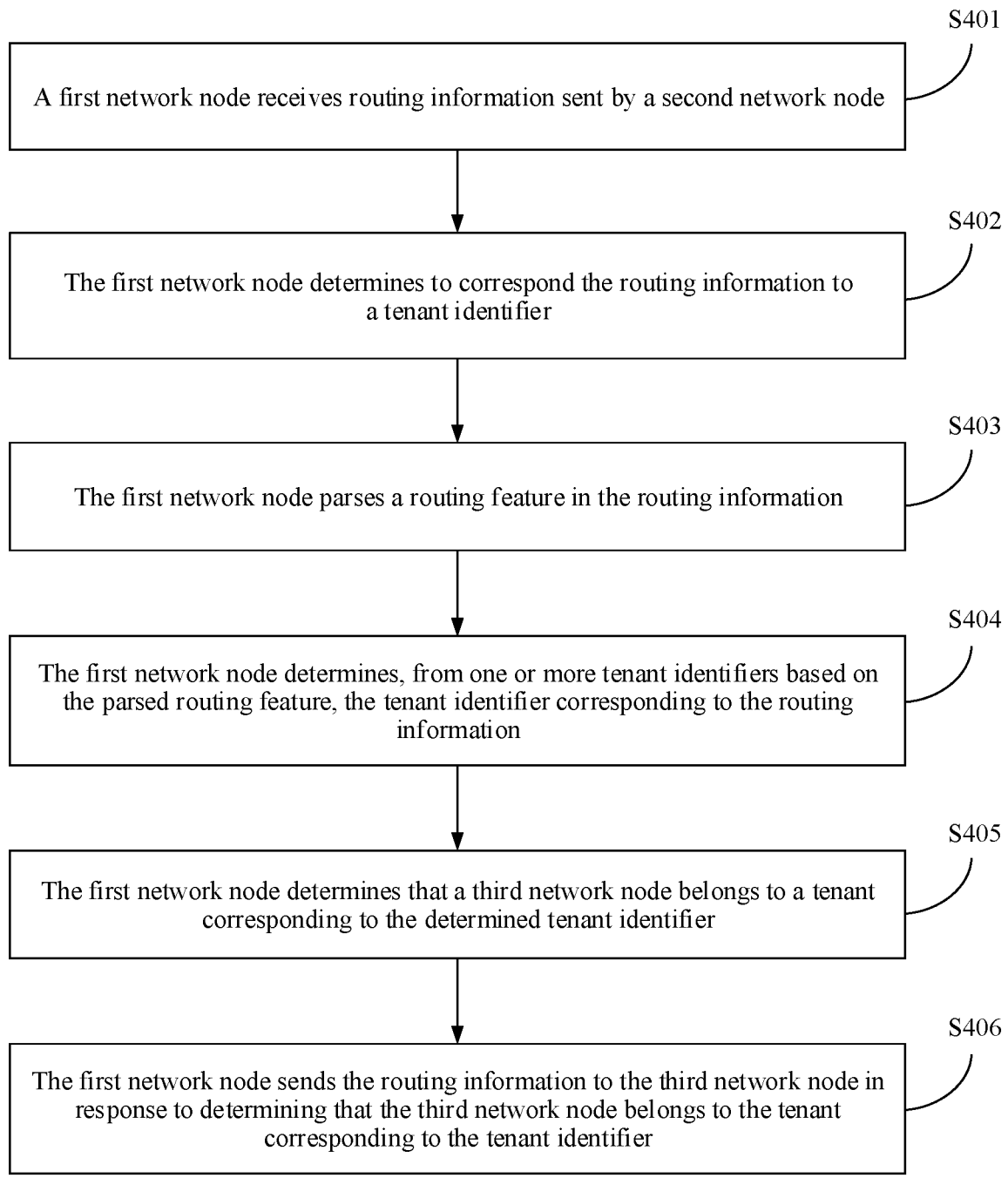
FIG. 4 is a schematic flowchart of another routing information sending method according to an embodiment of this application.

Specifically, FIG. 4 is a schematic flowchart of still another routing information sending method according to an embodiment of this application. The method may specifically include the following steps.

S401: A first network node receives routing information sent by a second network node.

S402: The first network node determines the routing information corresponds to a tenant identifier.

In this embodiment, the step S401 and the step S402 are similar to the step S301 and the step S302 in the foregoing embodiment. For a specific implementation process of the step S401 and the step S402, refer to related descriptions in the foregoing embodiment. Details are not described herein again.

S403: The first network node parses a routing feature in the routing information.

S404: The first network node determines, from one or more tenant identifiers based on the parsed routing feature, the tenant identifier corresponding to the routing information.

In this embodiment, if the first network node determines the plurality of tenant identifiers based on the received routing information, in an example, the first network node may establish a correspondence between a first session and a plurality of tenant identifiers. The first session is a session between the first network node and the second network node. The plurality of tenant identifiers may be filtered according to a preset filtering policy for the tenant identifiers, to determine the tenant identifier corresponding to the routing information, in other words, determine a tenant identifier of a tenant to which devices belong, where a routing connection is established between the devices.

In a specific implementation example, the first network node may determine whether the plurality of tenant identifiers are determined based on the routing information. If the plurality of tenant identifiers are determined based on the routing information, the first network node may parse the routing feature in the routing information. In an example, the first network node may specifically parse one or more features: a community attribute, an extended community attribute, a prefix address of a route, and an autonomous system path that are of the routing information. Then, the first network node may compare the routing feature obtained by parsing with a routing feature corresponding to each tenant identifier, and determine a tenant identifier corresponding to the same routing feature as the tenant identifier corresponding to the routing information. In this way, after the tenant identifier corresponding to the routing information is filtered from the plurality of tenant identifiers, when advertising the route, the first network node needs to advertise the route only to a third network node belonging to a tenant corresponding to the tenant identifier, and does not need to advertise the route to a network node belonging to a tenant corresponding to another tenant identifier, to reduce a scale of routes advertised by the first network node.

S405: The first network node determines that the third network node belongs to the tenant corresponding to the determined tenant identifier.

S406: The first network node sends the routing information to the third network node in response to determining that the third network node belongs to the tenant corresponding to the tenant identifier.

In this embodiment, based on the foregoing embodiment, the filtering policy for the tenant identifiers is set, so that when the first network node determines the plurality of tenant identifiers based on the routing information, the tenant identifier corresponding to the routing information can be filtered from the plurality of tenant identifiers by using the routing feature of the routing information. Therefore, when advertising the route, the first network node needs to advertise the route only to the third network node belonging to the tenant corresponding to the tenant identifier, and does not need to advertise the route to the third network node belonging to the tenant corresponding to the another tenant identifier, to reduce the scale of the routes advertised by the first network node.

In an actual application, the second network node may be a device (for example, CPE) belonging to a tenant, or may be a node (for example, an RR) that is on a network and that supports the routing connection. Therefore, this embodiment of this application may be applied to at least two different scenarios. To describe the technical solutions in the embodiments of this application in more detail, the following describes the technical solutions in the embodiments of this application with reference to two specific scenarios.

Figure 5:
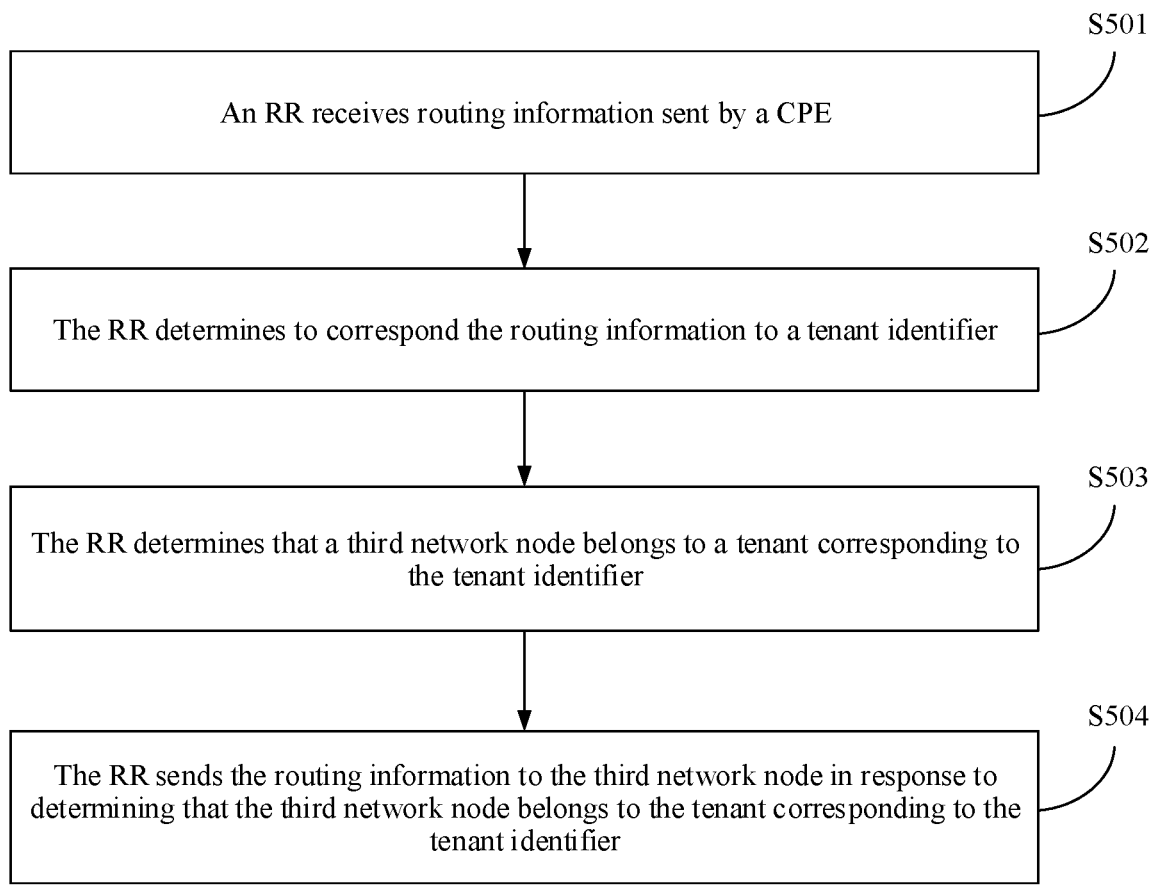
FIG. 5 is a schematic flowchart of still another routing information sending method according to an embodiment of this application.

With reference to an application scenario in which the second network node is CPE of a tenant, an embodiment of this application provides a routing information sending method. The first network node is an RR. FIG. 5 is a schematic flowchart of another routing information sending method according to an embodiment of this application. The method may specifically include the following steps.

S501: An RR receives routing information sent by CPE.

S502: The RR determines the routing information corresponds to a tenant identifier.

In this embodiment, a correspondence between a first session and a tenant identifier may be pre-established. The first session may be a BGP session between the CPE and the RR. In this way, after receiving the routing information sent by the CPE, the RR may find, based on the established correspondence between a first session and a tenant identifier, the tenant identifier corresponding to the first session between the CPE and the RR, and use the tenant identifier as the tenant identifier corresponding to the routing information. Certainly, the determined tenant identifier is also a tenant identifier of a tenant to which the CPE belongs.

S503: The RR determines that a third network node belongs to the tenant corresponding to the tenant identifier.

In this embodiment, a correspondence between a second session and a tenant identifier may be pre-established. The second session may be a BGP session between the RR and the third network node. In this way, after determining the tenant identifier, the RR may determine, by using the correspondence, the second session corresponding to the tenant identifier, and further determine, based on the second session, the third network node that has the second session with the RR.

S504: The RR sends the routing information to the third network node in response to determining that the third network node belongs to the tenant corresponding to the tenant identifier.

In this embodiment, the RR may determine the third network node by using the tenant identifier corresponding to the received routing information, in other words, determine a network node that needs to receive the routing information. This can shorten a time period required for the network node to advertise a route, and improve performance of the network node.

In the foregoing embodiment with reference to an application scenario, the second network node is used as a device belonging to a tenant, to describe the technical solution in this embodiment of this application. In some other application scenarios, the second network node may alternatively be a node that is on a network and that supports a routing connection. It is assumed that the first network node is an RR 1, and the second network node is an RR 2. In this application scenario, the RR 1 may determine a plurality of tenant identifiers based on routing information sent by the RR 2. To reduce a scale of routes advertised by the RR 1, a corresponding filtering policy may be set on the RR 1, and the filtering policy is used to filter the plurality of tenant identifiers determined by the RR 1.

Figure 6:
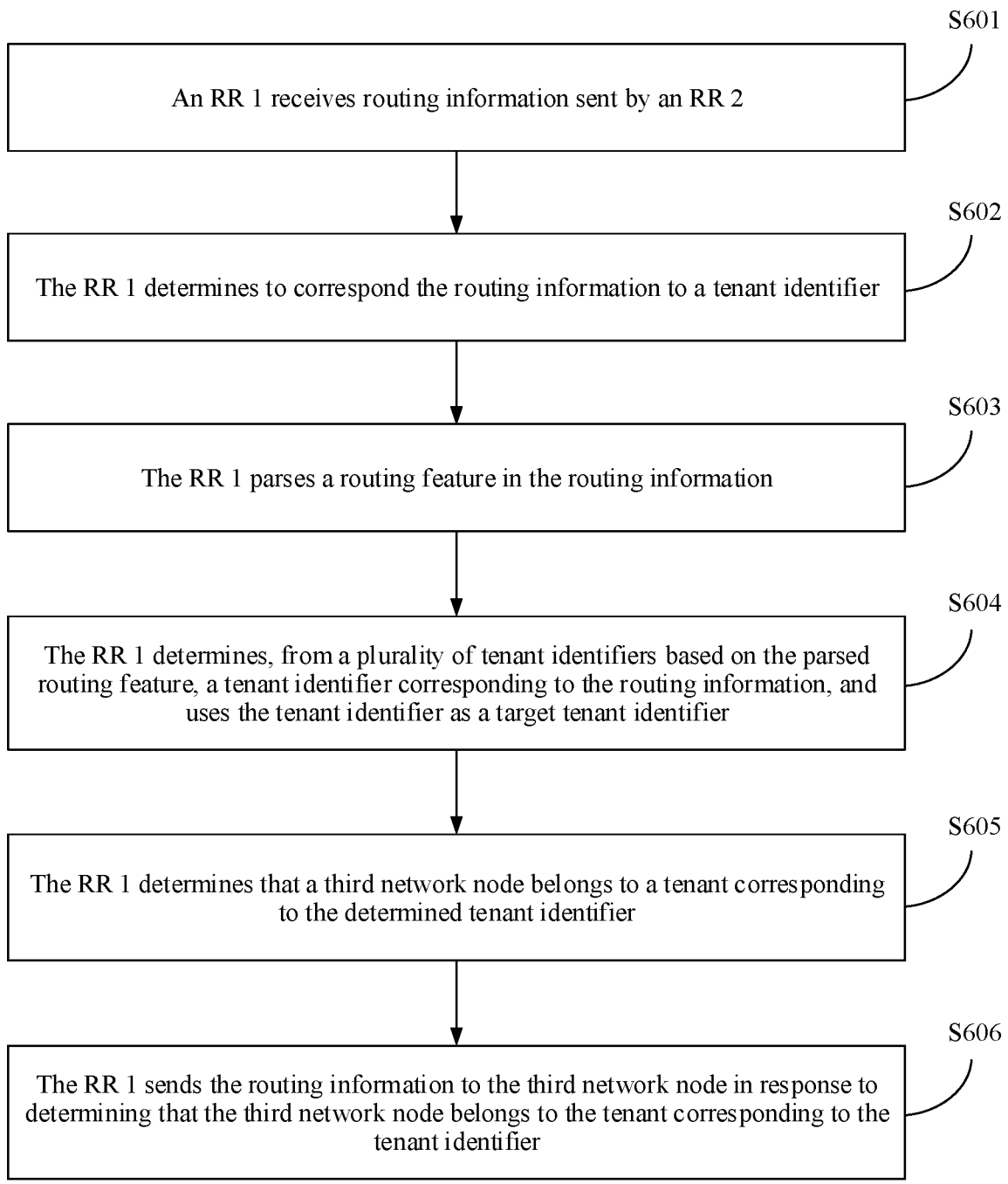
FIG. 6 is a schematic flowchart of yet another routing information sending method according to an embodiment of this application.

With reference to an application scenario in which the RR 2 is a node supporting a routing connection, an embodiment of this application provides a routing information sending method. FIG. 6 is a schematic flowchart of still another routing information sending method according to an embodiment of this application. The method may specifically include the following steps.

S601: An RR 1 receives routing information sent by an RR 2.

S602: The RR 1 determines the routing information corresponds to a tenant identifier.

S603: The RR 1 parses a routing feature in the routing information.

S604: The RR 1 determines, from a plurality of tenant identifiers based on the parsed routing feature, a tenant identifier corresponding to the routing information, and uses the tenant identifier as a target tenant identifier.

In this embodiment, the RR 1 may determine the plurality of tenant identifiers based on the received routing information. In this case, the RR 1 may filter the plurality of tenant identifiers according to a filtering policy that is for the tenant identifiers and that is preset on the RR 1, to determine a tenant identifier of a tenant to which devices belong, where a routing connection needs to be established between the devices.

In a specific implementation, the RR 1 may determine whether the plurality of tenant identifiers are determined based on the routing information. If the plurality of tenant identifiers are determined based on the routing information, the RR 1 may parse the routing feature in the routing information. The RR 1 may determine the plurality of tenant identifiers based on a correspondence between an established first session and a plurality of tenant identifiers. In an example, specifically, one or more of features: a community attribute, an extended community attribute, a prefix address of a route, and an autonomous system path that are of the routing information may be parsed. Then, the RR 1 may compare the routing feature obtained by parsing with a routing feature corresponding to each tenant identifier, and determine a tenant identifier corresponding to the same routing feature as the tenant identifier corresponding to the routing information. In this way, after the tenant identifier corresponding to the routing information is filtered from the plurality of tenant identifiers, when advertising a route, the RR 1 needs to advertise the route only to a third network node belonging to a tenant corresponding to the tenant identifier, and does not need to advertise the route to a network node belonging to a tenant corresponding to another tenant identifier, to reduce a scale of routes advertised by the RR 1.

S605: The RR 1 determines that the third network node belongs to the tenant corresponding to the determined tenant identifier.

S606: The RR 1 sends the routing information to the third network node in response to determining that the third network node belongs to the tenant corresponding to the tenant identifier.

In this embodiment, based on the foregoing embodiment, the filtering policy for the tenant identifiers is set on the RR 1, so that when the RR 1 determines the plurality of tenant identifiers based on the routing information, the tenant identifier corresponding to the routing information can be filtered from the plurality of tenant identifiers by using the routing feature of the routing information. Therefore, when advertising the route, the RR 1 needs to advertise the route only to the third network node belonging to the tenant corresponding to the tenant identifier, and does no need to advertise the route to a third network node belonging to the tenant corresponding to the another tenant identifier, to reduce the scale of the routes advertised by the RR 1.

Figure 7:
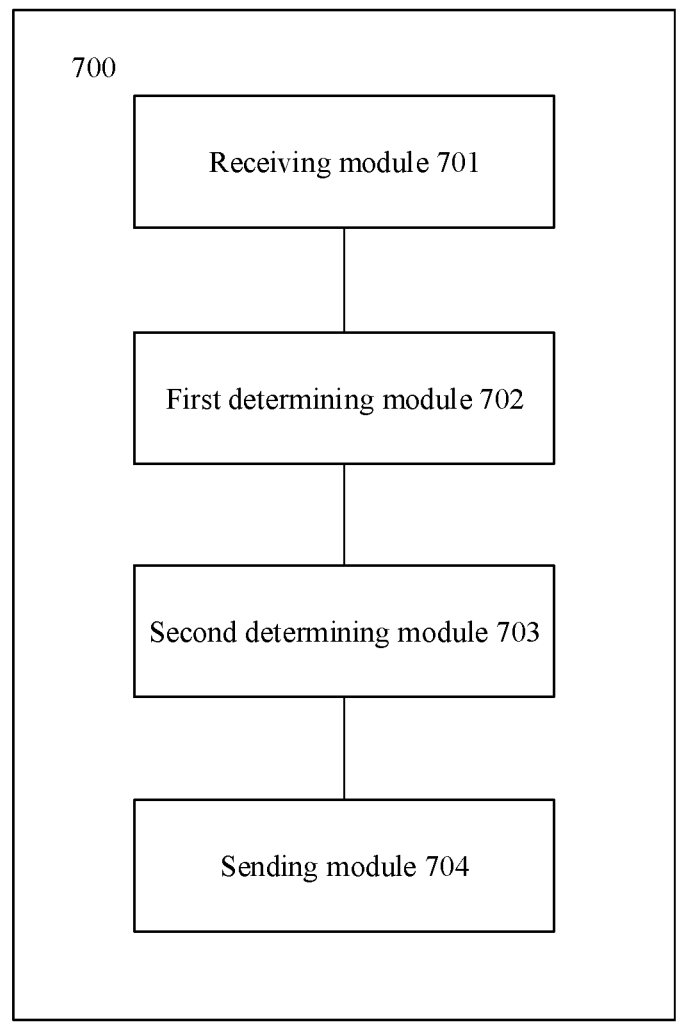
FIG. 7 is a schematic structural diagram of a routing information sending apparatus according to an embodiment of this application.

In addition, an embodiment of this application further provides a routing information sending apparatus. FIG. 7 is a schematic structural diagram of a routing information sending apparatus according to an embodiment of this application. The apparatus 700 may specifically include:

a receiving module 701, configured to receive routing information sent by a second network node;

a first determining module 702, configured to determine the routing information corresponds to a tenant identifier;

a second determining module 703, configured to determine that a third network node belongs to a tenant corresponding to the tenant identifier; and a sending module 704, configured to send the routing information to the third network node in response to determining that the third network node belongs to the tenant corresponding to the tenant identifier.

In some possible implementations, the first determining module 702 is specifically configured to determine that a first session corresponds to the tenant identifier. The first network node receives the routing information through the first session. The first session is a border gateway protocol session between the first network node and the second network node.

Because there is the first session between the first network node and the second network node, a correspondence between a first session and a tenant identifier may be pre-established. In this way, if the first network node receives, through the first session, the routing information sent by the second network node, the first network node may determine, based on the established correspondence, the tenant identifier corresponding to the first session. Because the routing information received by the first network node is received through the first session, the determined tenant identifier corresponds to the routing information.

In some possible implementations, the first determining module 702 is specifically configured to determine that the second network node sending the routing information belongs to the tenant corresponding to the tenant identifier.

In this implementation, a correspondence between a second network node and a tenant identifier may be pre-established. In this way, after receiving the routing information, the first network node may determine, based on the correspondence, the tenant identifier corresponding to the second network node sending the routing information. It may be understood that when the second network node corresponds to the tenant identifier, it indicates that the second network node belongs to the tenant corresponding to the tenant identifier.

In some possible implementations, the apparatus 700 further includes:

a generating module, configured to generate a routing entry based on the routing information; and an adding module, configured to add the routing entry to a routing information base corresponding to the tenant identifier.

Because the routing entry is generated and stored based on the routing information, when receiving a packet sent by a device of the tenant corresponding to the tenant identifier, the first network node can forward the packet to a corresponding next network node based on the routing entry stored in the routing information base. In this way, the packet can be forwarded.

Further, different tenants can correspond to different routing information bases. In this way, routing entries of the different tenants are prevented from being stored in one routing information base, to reduce a quantity of routing entries that are in the routing information base and that need to be searched for, to reduce a time period for searching for a routing entry during packet forwarding, and to improve forwarding efficiency.

In some possible implementations, the second determining module 703 is specifically configured to determine that a second session corresponds to the tenant identifier. The second session is a border gateway protocol session between the first network node and the third network node.

In this implementation, a correspondence between a second session and a tenant identifier may be pre-established. In this way, after determining the tenant identifier, the first network node may determine, based on the established correspondence, the second session corresponding to the tenant identifier, and determine, based on the second session, the third network node that forms the second session with the first network node. In this way, the third network node belonging to the tenant corresponding to the tenant identifier may be determined based on the second session.

In some possible implementations, the sending module 704 is specifically configured to send the routing information to the third network node by using an execution module corresponding to the tenant identifier.

Different tenant identifiers on the first network node correspond to different execution modules, and the execution module includes a central processing unit, a thread, or a process.

Because processes in which the first network node sends the routing information to third network nodes of different tenants are independent of each other, when the first network node determines a plurality of tenant identifiers based on the received routing information, a plurality of execution modules that are on the first network node and that correspond to the plurality of tenant identifiers may concurrently send the routing information to the third network nodes belonging to tenants corresponding to the different tenant identifiers, to improve processing efficiency of the first network node.

In some possible implementations, the second network node is a customer premises equipment CPE, and the tenant identifier includes one tenant identifier.

Alternatively, the second network node is a route reflector RR, and the tenant identifier includes one or more tenant identifiers.

It may be understood that if the second network node is CPE of a tenant, because the CPE belongs to only one tenant, and corresponds to a tenant identifier of only one tenant, the first network node may determine, based on routing information sent by the CPE, the tenant identifier of the tenant to which the CPE belongs, and there is also only one determined tenant identifier. If the second network node is a node RR that is on a network and that supports a routing connection, because the RR may serve a plurality of tenants, in other words, the RR may belong to the plurality of tenants, and therefore correspond to tenant identifiers of the plurality of tenants, the first network node determines, based on the routing information sent by the RR, the tenant identifiers of the plurality of tenants, and there may be a plurality of determined tenant identifiers. Certainly, if the RR serves only one tenant, there may also be only one determined tenant identifier.

In some possible implementations, the first determining module 702 includes:

a parsing unit, configured to parse a routing feature in the routing information; and a determining unit, configured to determine, from the one or more tenant identifiers based on the routing feature, the tenant identifier corresponding to the routing information.

In this implementation, if the first network node determines the plurality of tenant identifiers based on the routing information, the first network node may filter, according to a preset filtering policy, the tenant identifier corresponding to the routing information from the plurality of tenant identifiers. In this way, when advertising the route, the first network node needs to advertise the route only to the third network node belonging to the tenant corresponding to the tenant identifier, and does not need to advertise the route to a network node belonging to a tenant corresponding to another tenant identifier, to reduce a scale of the routes advertised by the first network node.

In some possible implementations, the routing feature includes any one or more of the following: a prefix address, a community attribute, an extended community attribute, and an autonomous system path that are of the routing information.

The foregoing describes the routing information sending apparatus provided in this embodiment of this application. For a specific implementation, refer to the foregoing description in the embodiment of the routing information sending method corresponding to FIG. 3. An effect achieved is consistent with that in the foregoing method embodiment. Details are not described herein again.

In the foregoing embodiment, the routing information sending apparatus in the embodiments of this application is described from a perspective of a functional entity. The following describes in detail a routing information sending device in the embodiments of this application from a perspective of hardware processing.

The following describes a routing information sending device according to an embodiment of this application. The device includes a processor, a memory, a communications interface, and a bus. The processor, the communications interface, and the memory communicate with each other by using the bus. The communications interface is configured to receive and send data. The memory is configured to store an instruction. The processor is configured to execute the instruction in the memory, to perform the following operations:

receiving routing information sent by a second network node;

determining the routing information corresponds to a tenant identifier; and determining that a third network node belongs to a tenant corresponding to the tenant identifier; and sending the routing information to the third network node in response to determining that the third network node belongs to the tenant corresponding to the tenant identifier.

In some possible implementations, that the first network node determines to correspond the routing information to the tenant identifier includes:

the first network node determines that a first session corresponds to the tenant identifier, and the first network node receives the routing information through the first session, where the first session is a border gateway protocol session between the first network node and the second network node.

In some possible implementations, that the first network node determines to correspond the routing information to the tenant identifier includes:

the first network node determines that the second network node sending the routing information belongs to the tenant corresponding to the tenant identifier.

In some possible implementations, that the first network node determines to correspond the routing information to the tenant identifier further includes:

the first network node generates a routing entry based on the routing information, and adds the routing entry to a routing information base corresponding to the tenant identifier.

In some possible implementations, that the first network node determines that the third network node belongs to the tenant corresponding to the tenant identifier includes:

the first network node determines that a second session corresponds to the tenant identifier, where the second session is a border gateway protocol session between the first network node and the third network node.

In some possible implementations, that the first network node sends the routing information to the third network node includes:

the first network node sends the routing information to the third network node by using an execution module corresponding to the tenant identifier, where different tenant identifiers on the first network node correspond to different execution modules, and the execution module includes a central processing unit, a thread, or a process.

In some possible implementations, the second network node is a customer premises equipment CPE, and the tenant identifier includes one tenant identifier.

Alternatively, the second network node is a route reflector RR, and the tenant identifier includes one or more tenant identifiers.

In some possible implementations, that the first network node determines correspond the routing information to the tenant identifier includes:

the first network node parses a routing feature in the routing information, and determines, from the one or more tenant identifiers based on the routing feature, the tenant identifier corresponding to the routing information.

In some possible implementations, the routing feature includes any one or more of the following: a prefix address, a community attribute, an extended community attribute, and an autonomous system path that are of the routing information.

The foregoing describes the routing information sending device provided in this embodiment of this application. For a specific implementation, refer to the foregoing description in the embodiment of the routing information sending method corresponding to FIG. 2. An effect achieved is consistent with that in the foregoing method embodiment. Details are not described herein again.

Figure 8:
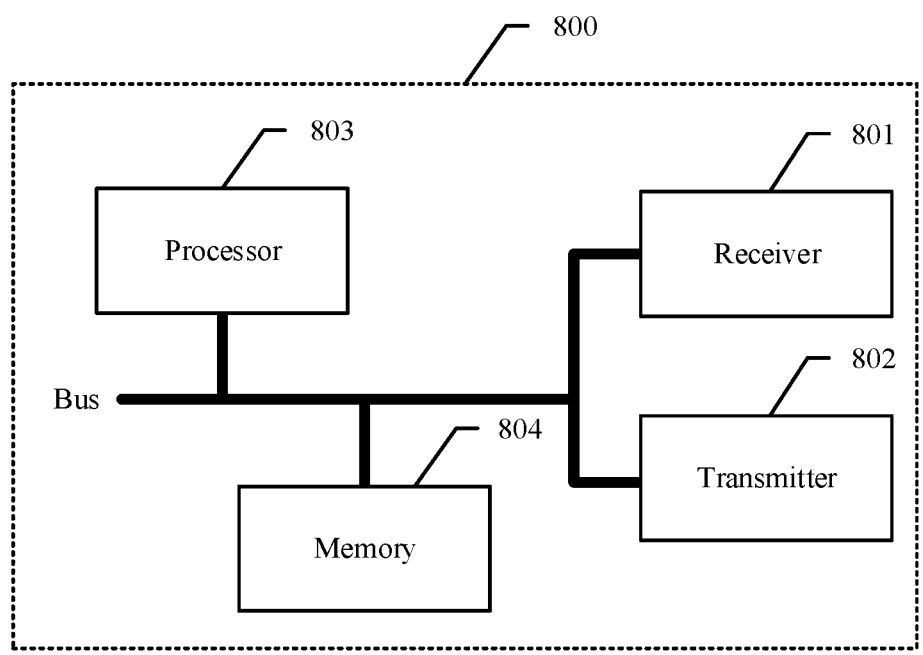
FIG. 8 is a schematic structural diagram of a routing information sending device according to an embodiment of this application.

The following describes the device in detail. Referring to FIG. 8, a device 800 includes a receiver 801, a transmitter 802, a processor 803, and a memory 804 (there may be one or more processors 803 in the device 800, and one processor is used as an example in FIG. 8). The communications interface may include the receiver 801 and the transmitter 802. In some embodiments of this application, the receiver 801, the transmitter 802, the processor 803, and the memory 804 may be connected by using the bus or in another manner. In FIG. 8, a connection by using the bus is used as an example.

The memory 804 may include a read-only memory and a random access memory, and provide an instruction and data to the processor 803. A part of the memory 804 may further include a non-volatile random access memory (NVRAM). The memory 804 stores an operating system and an operation instruction, an executable module or a data structure, or a subnet thereof, or an extended set thereof. The operation instruction may include various operation instructions for implementing various operations. The operating system may include various system programs, to implement various basic services and process hardware-based tasks.

The processor 803 controls an operation of the device 800, and the processor 803 may also be referred to as a central processing unit (CPU). In a specific application, components are coupled together by using a bus system. In addition to a data bus, the bus system includes a power bus, a control bus, and a status signal bus. However, for clear description, various types of buses in the figure are marked as the bus system.

The methods disclosed in the foregoing embodiments of this application may be applied to the processor 803, or may be implemented by the processor 803. The processor 803 may be an integrated circuit chip and has a signal processing capability. In an implementation process, steps in the foregoing methods can be implemented by using a hardware integrated logical circuit in the processor 803, or by using instructions in a form of software. The processor 803 may be a general purpose processor, a digital signal processor (DSP), an application specific integrated circuit (ASIC), a field-programmable gate array (FPGA) or another programmable logical device, a discrete gate or transistor logic device, or a discrete hardware component. It may implement or perform the methods, the steps, and logical block diagrams that are disclosed in the embodiments of this application. The general purpose processor may be a microprocessor, or the processor may be any conventional processor or the like. Steps of the methods disclosed with reference to the embodiments of this application may be directly executed and accomplished by a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory 804, and a processor 803 reads information in the memory 804 and completes the steps in the foregoing methods in combination with hardware of the processor.

The receiver 801 may be configured to: receive an input digit or character information, and generate signal input related to a related setting and function control of the network device 800. The transmitter 802 may include a display device such as a display screen. The transmitter 802 may be configured to output the digit or character information through an external interface.

In this embodiment of this application, the processor 803 is configured to perform the following operations:

receiving routing information sent by a second network node;

determining the routing information corresponds to a tenant identifier; and determining that a third network node belongs to a tenant corresponding to the tenant identifier; and sending the routing information to the third network node in response to determining that the third network node belongs to the tenant corresponding to the tenant identifier.

In addition, an embodiment of this application further provides a computer-readable storage medium. The computer-readable storage medium stores an instruction, and when the instruction is run on a computer or a processor, the computer or the processor is enabled to perform the foregoing routing information sending method.

In addition, an embodiment of this application further provides a computer program product including an instruction. When the computer program product runs on a computer or a processor, the computer or the processor is enabled to perform the foregoing routing information sending method.

"First" in names such as "first network node" and "first determining module" mentioned in the embodiments of this application is merely used as a name identifier, and does not represent first in a sequence. The rule is also applicable to "second", "third", and the like.

From the foregoing descriptions of the implementations, a person skilled in the art may clearly understand that some or all steps of the methods in the embodiments may be implemented by software in addition to a universal hardware platform. Based on such an understanding, the technical solutions of this application may be implemented in a form of a software product. The software product may be stored in a storage medium, such as a read-only memory (ROM)/RAM, a magnetic disk, or an optical disc, and includes a plurality of instructions for instructing a computer device (which may be a personal computer, a server, or a network communications device such as a router) to perform the methods described in the embodiments or some parts of the embodiments of this application.

The embodiments in this specification are all described in a progressive manner, for same or similar parts in the embodiments, refer to these embodiments, and each embodiment focuses on a difference from other embodiments. Especially, an apparatus embodiment is basically similar to a method embodiment, and therefore is described briefly; for related parts, refer to partial descriptions in the method embodiment. The described apparatus embodiment is merely an example. The modules described as separate parts may or may not be physically separate, and parts displayed as modules may or may not be physical modules, may be located in one position, or may be distributed on a plurality of network units. Some or all the modules may be selected according to actual needs to achieve the objectives of the solutions of the embodiments. A person of ordinary skill in the art may understand and implement the embodiments of the present disclosure without creative efforts.

The foregoing descriptions are merely example implementations of this application, but are not intended to limit the protection scope of this application.

What is claimed is:

1. A method for sending routing information, the method comprising:
   receiving, by a first network node, routing information from a second network node;
   determining, by the first network node, that the routing information corresponds to a tenant identifier;
   determining, by the first network node, that a third network node belongs to a tenant corresponding to the tenant identifier; and
   sending, by the first network node, the routing information to the third network node in response to determining that the third network node belongs to the tenant corresponding to the tenant identifier to enable the third network node to generate a routing entry based on the routing information.

2. The method according to claim 1, wherein the determining, by the first network node, that the routing information corresponds to the tenant identifier comprises:
   determining, by the first network node, that a first session corresponds to the tenant identifier; and
   receiving, by the first network node, the routing information through the first session, wherein the first session is a border gateway protocol session between the first network node and the second network node.

3. The method according to claim 1, wherein the determining, by the first network node, that the routing information corresponds to the tenant identifier comprises:
   determining, by the first network node, that the second network node from which the routing information is received belongs to the tenant corresponding to the tenant identifier.

4. The method according to claim 1, further comprising:
   generating, by the first network node, a routing entry based on the routing information; and
   adding, by the first network node, the routing entry to a routing information base corresponding to the tenant identifier.

5. The method according to claim 1, wherein the determining, by the first network node, that the third network node belongs to the tenant corresponding to the tenant identifier comprises:
   determining, by the first network node, that a second session corresponds to the tenant identifier, wherein the second session is a border gateway protocol session between the first network node and the third network node.

6. The method according to claim 1, wherein the sending, by the first network node, the routing information to the third network node comprises:
   sending, by the first network node, the routing information to the third network node by using an execution module corresponding to the tenant identifier, wherein the execution module comprises a central processing unit, a thread, or a process, and wherein different tenant identifiers on the first network node correspond to different execution modules, respectively.

7. The method according to claim 1, wherein:
   the second network node is a customer premises equipment (CPE), and the tenant identifier comprises one tenant identifier; or
   the second network node is a route reflector (RR), and the tenant identifier comprises one or more tenant identifiers.

8. The method according to claim 7, wherein the determining, by the first network node, that the routing information corresponds to the tenant identifier comprises:
   parsing, by the first network node, a routing feature in the routing information; and
   determining, by the first network node, the tenant identifier corresponding to the routing information based on the routing feature.

9. The method according to claim 8, wherein the routing feature comprises at least one of the following: a prefix address of the routing information, a community attribute of the routing information, an extended community attribute of the routing information, or an autonomous system path of the routing information.

10. The method according to claim 1, wherein the tenant identifier comprises a network slice identifier.

11. An apparatus for sending routing information, the apparatus comprising:
    at least one processor; and
    one or more memories coupled to the at least one processor and storing instructions for execution by the at least one processor, wherein the instructions instruct the at least one processor to cause the apparatus to:
    receive routing information from a second network node;
    determine that the routing information corresponds to a tenant identifier;
    determine that a third network node belongs to a tenant corresponding to the tenant identifier; and
    send the routing information to the third network node in response to determining that the third network node belongs to the tenant corresponding to the tenant identifier to enable the third network node to generate a routing entry based on the routing information.

12. The apparatus according to claim 11, wherein the instructions further instruct the at least one processor to cause the apparatus to:
    determine that a first session corresponds to the tenant identifier, wherein the first network node receives the routing information through the first session, and the first session is a border gateway protocol session between the apparatus and the second network node.

13. The apparatus according to claim 11, wherein the instructions further instruct the at least one processor to cause the apparatus to:
    determine that the second network node from which the routing information is received belongs to the tenant corresponding to the tenant identifier.

14. The apparatus according to claim 11, wherein the instructions further instruct the at least one processor to cause the apparatus to:
    generate a routing entry based on the routing information; and
    add the routing entry to a routing information base corresponding to the tenant identifier.

15. The apparatus according to claim 11, wherein the instructions further instruct the at least one processor to cause the apparatus to:
    determine that a second session corresponds to the tenant identifier, wherein the second session is a border gateway protocol session between the apparatus and the third network node.

16. The apparatus according to claim 11, wherein the instructions further instruct the at least one processor to cause the apparatus to:
    send the routing information to the third network node corresponding to the tenant identifier by using an execution module corresponding to the tenant identifier, wherein the execution module comprises a central processing unit, a thread, or a process, and wherein different tenant identifiers on the apparatus correspond to different execution modules, respectively.

17. The apparatus according to claim 11, wherein:
    the second network node is a customer premises equipment (CPE), and the tenant identifier comprises one tenant identifier; or
    the second network node is a route reflector (RR), and the tenant identifier comprises one or more tenant identifiers.

18. The apparatus according to claim 17, wherein the instructions further instruct the at least one processor to cause the apparatus to:
    parse a routing feature in the routing information; and
    determine the tenant identifier corresponding to the routing information based on the routing feature.

19. The apparatus according to claim 18, wherein the routing feature comprises at least one of the following: a prefix address of the routing information, a community attribute of the routing information, an extended community attribute of the routing information, or an autonomous system path of the routing information.

20. The apparatus according to claim 11, wherein the tenant identifier comprises a network slice identifier.

\* \* \* \* \*

UNITED STATES PATENT AND TRADEMARK OFFICE
CERTIFICATE OF CORRECTION

PATENT NO. : 11,374,860 B2
APPLICATION NO. : 17/226990
DATED : June 28, 2022
INVENTOR(S) : Haibo Wang et al.

It is certified that error appears in the above-identified patent and that said Letters Patent is hereby corrected as shown below:

On the Title Page

Item (56) Other Publications, Column 2, Line 2: "draft-drake-nvo3-evpn-control-plane-OO," Internet Engineering Task" should read -- draft-drake-nvo3-evpn-control-plane-00," Internet Engineering Task --.

Signed and Sealed this
Twenty-fifth Day of October, 2022

Katherine Kelly Vidal
*Director of the United States Patent and Trademark Office*